(12) United States Patent
Yang et al.

(10) Patent No.: US 11,328,520 B2
(45) Date of Patent: May 10, 2022

(54) LANE LINE DETERMINATION METHOD AND APPARATUS, LANE LINE POSITIONING ACCURACY EVALUATION METHOD AND APPARATUS, AND DEVICE

(71) Applicant: Beijing Baidu Netcom Science and Technology Co., LTD, Beijing (CN)

(72) Inventors: Pengbin Yang, Beijing (CN); Caimao Yuan, Beijing (CN); Fengze Han, Beijing (CN); Yang Yang, Beijing (CN); Fei Ni, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 0 days.

(21) Appl. No.: 17/343,100

(22) Filed: Jun. 9, 2021

(65) Prior Publication Data

US 2021/0295061 A1   Sep. 23, 2021

(30) Foreign Application Priority Data

Jul. 20, 2020   (CN) .......................... 202010700409.X

(51) Int. Cl.
*G06V 20/56*   (2022.01)
*B60W 40/072*   (2012.01)
(Continued)

(52) U.S. Cl.
CPC .......... *G06V 20/588* (2022.01); *B60W 30/12* (2013.01); *B60W 40/072* (2013.01);
(Continued)

(58) Field of Classification Search
None
See application file for complete search history.

(56) References Cited

U.S. PATENT DOCUMENTS

| 9,076,046 B2 * | 7/2015 | Sakamoto | G06K 9/4633 |
| 10,650,252 B2 * | 5/2020 | Kaneko | G06K 9/00798 |

(Continued)

FOREIGN PATENT DOCUMENTS

| CN | 109359602 A | 2/2019 |
| CN | 110647877 A | 1/2020 |

(Continued)

OTHER PUBLICATIONS

Sep. 29, 2021 (EP)—EESR—App. No. 21164853.0.
(Continued)

*Primary Examiner* — Todd Melton
(74) *Attorney, Agent, or Firm* — Banner & Witcoff, Ltd.

(57) ABSTRACT

A lane line determination method and apparatus, a lane line positioning accuracy evaluation method and apparatus, a device and a storage medium are provided, which are related to a field of image processing, and particularly to fields of autonomous driving, intelligent transportation, computer vision and the like. The specific implementation is: determining a line in a received road image; screening pixels forming the line and determining pixels forming a lane line; and fitting the pixels forming the lane line to obtain the lane line. According to the technology of the present disclosure, the disadvantages of manual labeling can be overcome, and the lane line in the image collected by image acquisition device can be automatically recognized using an image recognition method, thereby improving the automation degree of lane labeling.

18 Claims, 9 Drawing Sheets

(51) Int. Cl.
*G06T 7/13* (2017.01)
*G06V 10/44* (2022.01)
*B60W 30/12* (2020.01)
*B60W 40/076* (2012.01)

(52) U.S. Cl.
CPC ............ *B60W 40/076* (2013.01); *G06T 7/13* (2017.01); *G06V 10/44* (2022.01); *B60W 2420/42* (2013.01); *B60W 2552/30* (2020.02)

(56) References Cited

U.S. PATENT DOCUMENTS

| | | | | |
|---|---|---|---|---|
| 10,685,242 | B2* | 6/2020 | Kawano | G06K 9/00798 |
| 10,699,135 | B2* | 6/2020 | Zhang | G06K 9/4609 |
| 10,970,566 | B2* | 4/2021 | Gu | G06K 9/6218 |
| 11,087,469 | B2* | 8/2021 | Mittal | G06T 7/13 |
| 2019/0241180 | A1* | 8/2019 | Zhu | G05D 1/0246 |

FOREIGN PATENT DOCUMENTS

| | | |
|---|---|---|
| CN | 111178150 A | 5/2020 |
| EP | 3594852 A1 | 1/2020 |

OTHER PUBLICATIONS

Islam Gamal, et al., "A robust, real-time and calibration-free lane departure warning system", Microprocessors and Microsystems, IPC Business Press Ltd., London, GB, vol. 21, Aug. 21, 2019 at https://doi.org/10.1016/j.micpro.2019.102874, 0141-9331/ © 2019 Published by Elsevier B.V., retrieved on Aug. 21, 2019, pp. 1-10.
Ravi Kumar Satzoda et al., On Performance Evaluation Metrics for Lane Estimation:, 18th International Conference on Patterns Recognition (ICPR'06), IEEE Computer Society, US, Aug. 24, 2014, ISSN: 1051-4651, DOI, 10.1109/ICPR.2014.453, retrieved Dec. 4, 2014, pp. 2625-2630.

* cited by examiner

LANE LINE DETERMINATION METHOD AND APPARATUS, LANE LINE POSITIONING ACCURACY EVALUATION METHOD AND APPARATUS, AND DEVICE

CROSS-REFERENCE TO RELATED APPLICATIONS

This application claims priority to Chinese patent application, No. 202010700409.X, entitled "Lane Line Determination Method and Apparatus, Lane Line Positioning Accuracy Evaluation Method and Apparatus, and Device", filed with the Chinese Patent Office on Jul. 20, 2020, which is hereby incorporated by reference in its entirety.

TECHNICAL FIELD

The present disclosure relates to a technical field of image processing, and particularly to fields of autonomous driving, intelligent transportation, computer vision and the like.

BACKGROUND

In the current positioning evaluation, a true value of a lane line is acquired by manually labeling the lane line. The specific solution is as follows: in an image collected by a vehicle front-view image acquisition device, a position of a lane line is manually labeled, and a positioning accuracy difference is subsequently determined through an evaluation algorithm.

SUMMARY

The present disclosure provides a lane line determination method and apparatus, a lane line positioning accuracy evaluation method and apparatus, a device, and a storage medium.

According to a first aspect of the present disclosure, an embodiment of the present disclosure provides a lane line determination method, including:
  determining a line in a received road image;
  screening pixels forming the line and determining pixels forming a lane line; and
  fitting the pixels forming the lane line to obtain the lane line.

According to a second aspect of the present disclosure, an embodiment of the present disclosure provides a lane line positioning accuracy evaluation method, including:
  acquiring a detection value of the lane line to be evaluated;
  acquiring a true value of the lane line, wherein the true value is obtained by the method according to any one of claims 1 to 7; and
  evaluating a detection value of the lane line to be evaluated according to an error between the detection value of the lane line and the true value of the lane line.

According to a third aspect of the present disclosure, an embodiment of the present disclosure provides a lane line determination apparatus, including:
  a line determination module configured to determine a line in a received road image;
  a pixel determination module configured to screen pixels forming the line and determine pixels forming a lane line; and
  a pixel fitting module configured to fit the pixels forming the lane line to obtain the lane line.

According to a fourth aspect of the present disclosure, an embodiment of the present disclosure provides a lane line positioning accuracy evaluation apparatus, including:
  a lane line detection value acquisition module configured to acquire a detection value of a lane line to be evaluated;
  a lane line true value acquisition module configured to acquire a true value of the lane line obtained by the above apparatus; and
  an evaluation module configured to evaluate the detection value of the lane line to be evaluated according to an error between the detection value of the lane line and the true value of the lane line.

According to a fifth aspect of the present disclosure, an embodiment of the present disclosure provides an electronic device, including:
  at least one processor; and
  a memory communicatively connected to the at least one processor, wherein
  the memory stores instructions executable by the at least one processor, the instructions, when executed by the at least one processor, enable the at least one processor to perform the method provided by any of embodiments of the present disclosure.

According to a sixth aspect of the present disclosure, an embodiment of the present disclosure provides a non-transitory computer-readable storage medium for storing computer instructions, wherein the computer instructions, when executed by a computer, cause the computer to implement method provided by any of embodiments of the present disclosure.

It should be understood that the content described in this section is intended neither to identify the key or important features of the embodiments of the present disclosure, nor to limit the scope of the present disclosure. Other features of the present disclosure will be easily understood from the following description.

BRIEF DESCRIPTION OF THE DRAWINGS

The accompanying drawings are provided for better understanding of the solution, rather than limiting the present disclosure. In which.

DETAILED DESCRIPTION OF THE EMBODIMENTS

Exemplary embodiments of the present disclosure are described below with reference to the accompanying drawings, including various details of the embodiments of the present disclosure to facilitate the understanding, and they should be considered as merely exemplary. Thus, it should be realized by those of ordinary skill in the art that various changes and modifications can be made to the embodiments described here without departing from the scope and spirit of the present disclosure. Also, for the sake of clarity and conciseness, the contents of well-known functions and structures are omitted in the following description.

Figure 1:
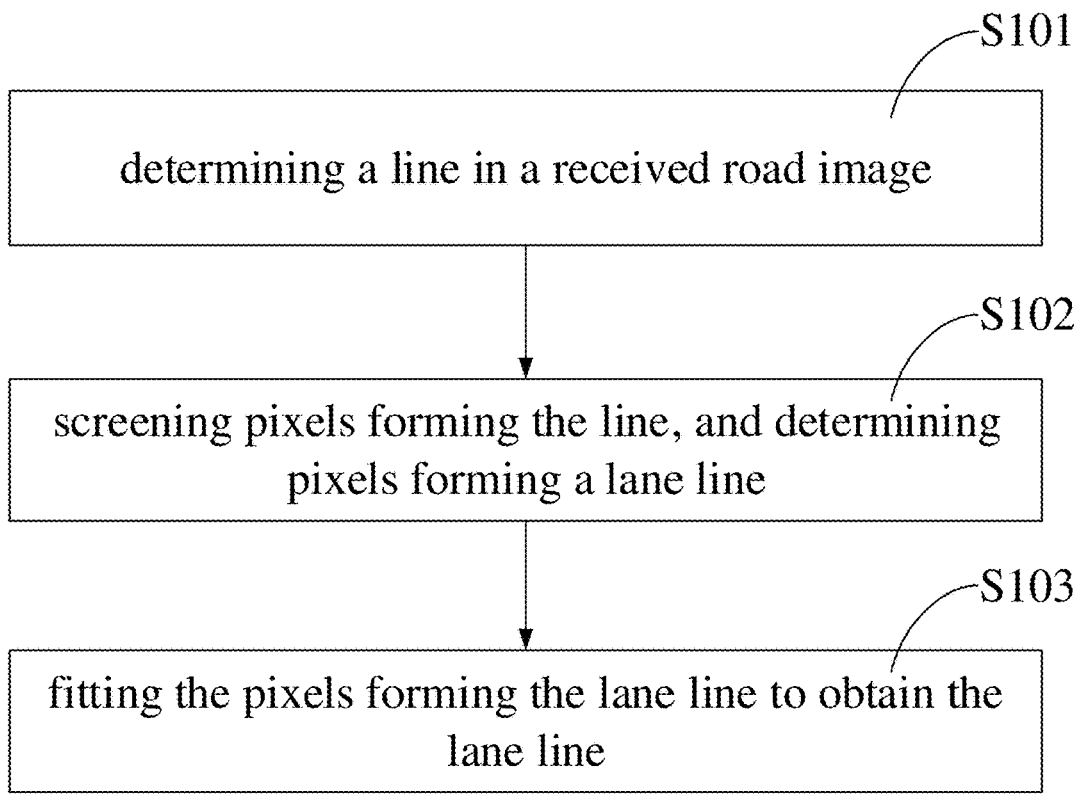
FIG. 1 is a flowchart of a lane line determination method according to the present disclosure.

As shown in FIG. 1, in an embodiment of the present disclosure, there is provided a lane line determination method, including:

S101: determining a line in a received road image;

S102: screening pixels forming the line and determining pixels forming a lane line;

S103: fitting the pixels forming the lane line to obtain the lane line.

The road image may be collected by an image acquisition device disposed on a target vehicle, or may be an existing road image sample, etc. The embodiment of the present disclosure is described with an example in which the road image is collected by the image acquisition device disposed on the vehicle. The image acquisition devices may be disposed on both sides of the target vehicle respectively to acquire the road images on both sides of the target vehicle.

The images collected by the image acquisition devices are processed in the same way, and any one thereof can be selected for explanation. For instance, the road image collected by the image acquisition device disposed on a side of a driver's position is taken as an example.

The received road image firstly may be preprocessed, which may include converting the road image into a gray image, filtering bright spots caused by light reflection by asphalt in the road image through median filtering, and smoothing the image through Gaussian filtering.

An edge may be extracted from the preprocessed road image. Based on the extracted edge, a line segment in the edge may be determined. For example, when the edge is a straight line, the determined line segment is highly coincident with the edge. When the edge is a curve, the determined line segment may be composed of a plurality of short line segments. The line in the road image may be determined according to the degree of coincidence between the line segment and the edge, and the line may be single or plural.

Based on calibration parameters of the image acquisition device, the pixels forming the lines may be transformed into a vehicle coordinate system of the target vehicle through an inverse perspective transformation. For example, the vehicle coordinate system may take a midpoint of a rear axle of the target vehicle as an origin, and a traveling direction of the target vehicle as an X axis, while a Y axis is perpendicular to the X axis and pointed to a left side (driver side) of the vehicle.

The directions of the lines may be counted to determine a principal axis according to a counting result. A direction perpendicular to the principal axis is taken as a pixel projection axis. The pixels forming the lines are projected to the pixel projection axis.

The pixels forming the vehicle lane line may be determined according to a projection distribution result of the pixels on the pixel projection axis. The vehicle lane line may be determined by fitting the determined pixels forming the vehicle lane line.

Through the above method, the disadvantages of manual labeling can be overcome, and the vehicle lane line in the image collected by the image acquisition device can be automatically recognized using an image recognition method, thereby improving the automation degree of lane labelling.

Figure 2:
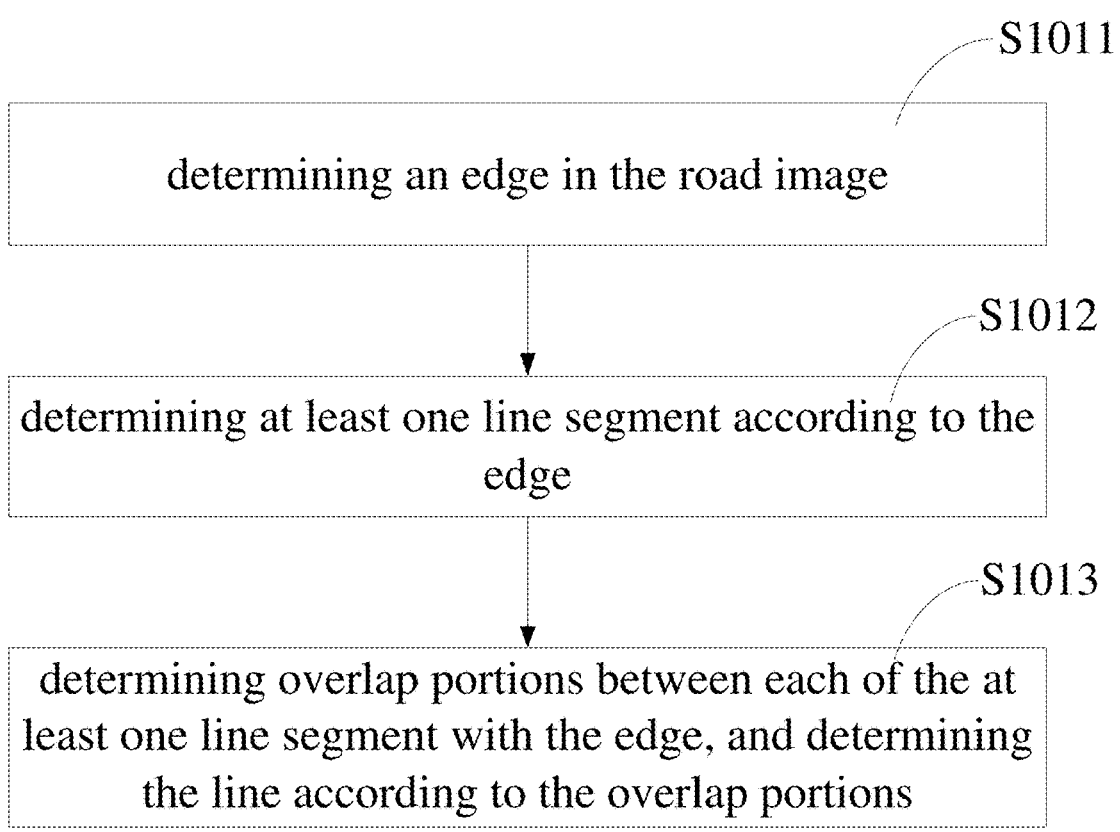
FIG. 2 is a flowchart of determination of a line in a road image according to the present disclosure.

As shown in FIG. 2, in one embodiment, step S101 includes the steps of:

S1011: determining an edge in the road image;

S1012: determining at least one line segment according to the edge;

S1013: determining overlap portions between each of the at least one line segment with the edge, and determining the line according to the overlap portion.

In this embodiment, an edge detection algorithm (Canny) may be adopted to detect the edge in the road image. Since the scene in the field of view of the road image is relatively clean, and usually there are only a white vehicle lane line and a background of a black asphalt pavement, the mature edge detection method can be directly adopted to acquire the edge in the road image.

Figure 3:
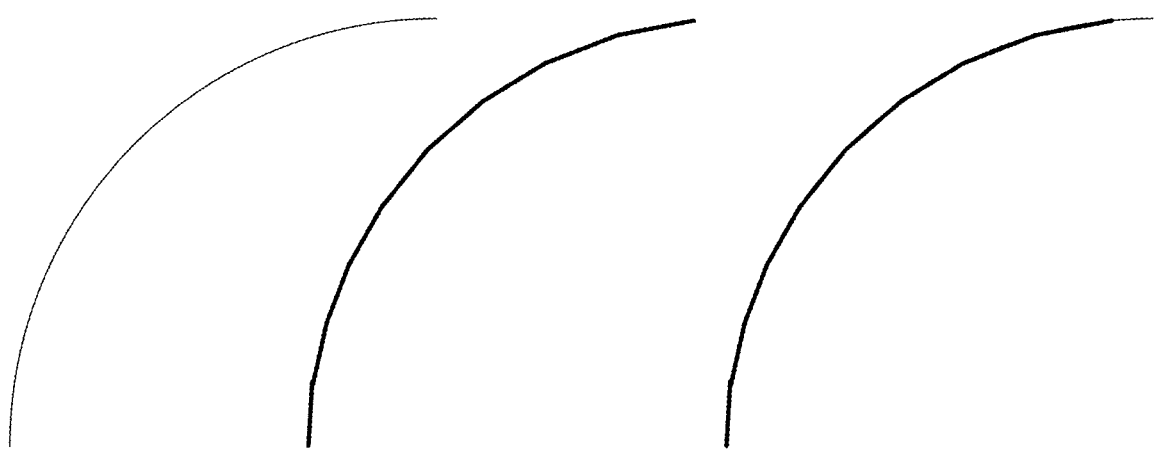
FIG. 3 is a schematic diagram of determination of a line in a road image according to the present disclosure.

With reference to FIG. 3, at least one straight line segment in the edge is determined by a Hough straight line detection. For example, a left side in FIG. 3 is a schematic diagram of an edge in a road image, a middle part in FIG. 3 is a schematic diagram of a plurality of line segments determined from the edge, and a right side in FIG. 3 is a schematic diagram of a superposition of the edge and the line segments.

The Hough straight line detection obtains a strictly straight line. Since an edge in an image may be a curve as shown in FIG. 3 or a non-standard straight line, it is possible to determine the overlapping part of each of the at least one line segment with the edge, and then determine the overlapping part as the line in the road image. The line corresponding to the overlapping part may be various line segments such as a straight line, a curve, etc.

According to the above solution, the lines in the road image can be determined based on the image detection technology. Since the lines are components of the vehicle lane line, the accurate determination of the line in the road image can lay a foundation for the subsequent determination of the vehicle lane line.

Figure 4:
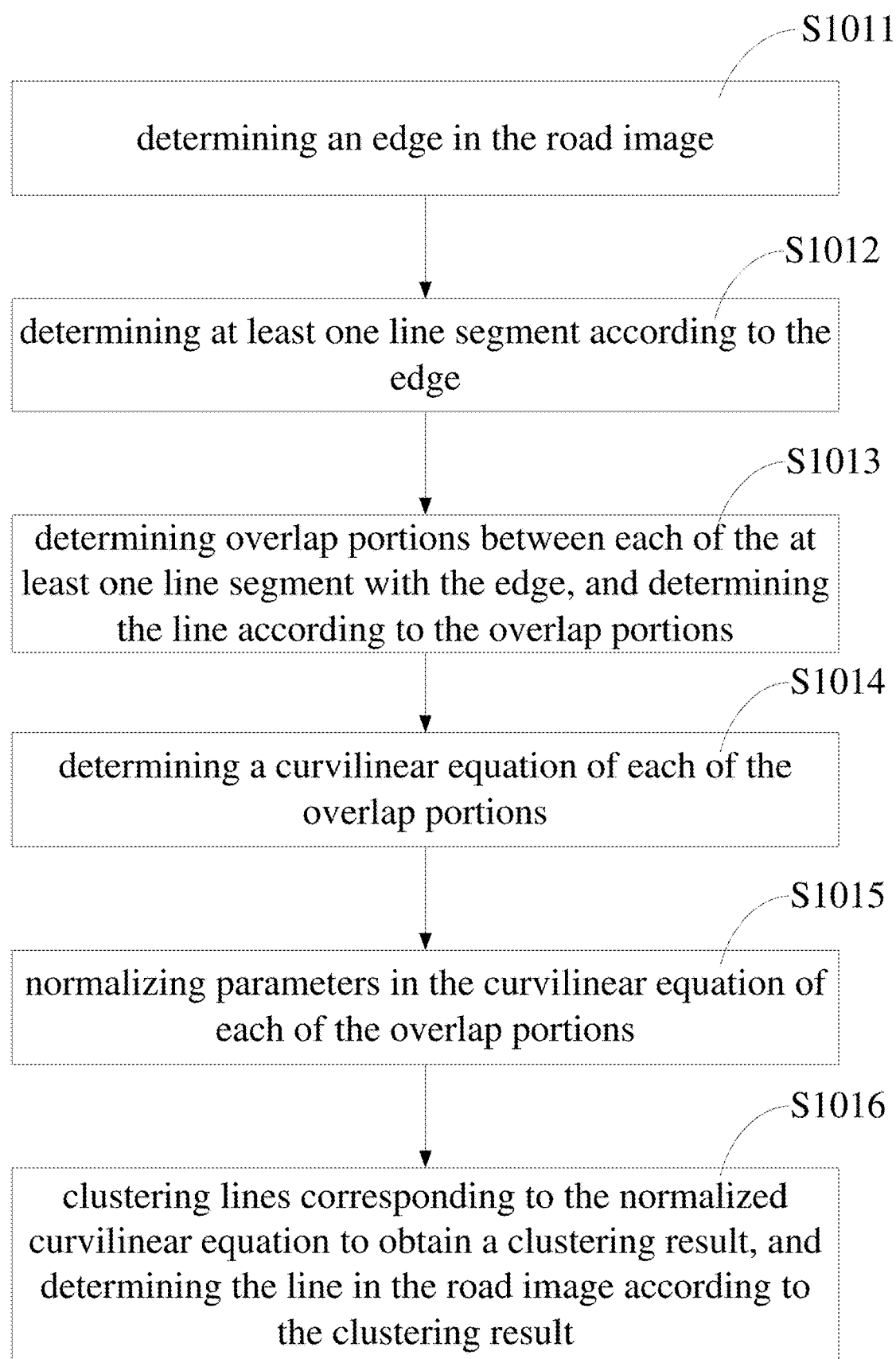
FIG. 4 is a flowchart of determination of a line in a road image according to the present disclosure.

With reference to FIG. 4, in one embodiment, step S101 further includes:

S1014: determining a curvilinear equation of each of the overlap portion;

S1015: normalizing parameters in the curvilinear equation of each of the overlap portion;

S1016: clustering lines corresponding to the normalized curvilinear equation to obtain a clustering result, and determining the line in the road image according to the clustering result.

After the lines corresponding to the overlap portions in the road image are determined, the curvilinear equation of the line corresponding to each of the overlap portions can be determined. In the present embodiment, the line corresponding to each of the overlap portions may be represented by a quadratic curvilinear equation, which may be expressed as $y=y=ax^2+bx+c$, wherein a is a quadratic coefficient, b is a linear coefficient, c is a constant term, x is an independent variable and y is a dependent variable.

For example, with respect to a curve with a small radian, its quadratic coefficient is often smaller than its constant term by several orders of magnitudes. Generally, such data needs to be normalized rather than directly processed in the conventional clustering method. The normalized data is utilized for clustering.

For example, the overlap portion in the road image includes three lines: $y_1$, $y_2$ and $y_3$.

The first line $y_1$ is expressed as $y_1=a_1x^2+b_1x+c_1$;
The second line $y_2$ is expressed as $y_2=a_2x^2+b_2x+c_2$;
The third line $y_3$ is expressed as $y_3=a_3x^2+b_3x+c_3$.

The above three lines may be abstracted as three points denoted as $A_1$, $A_2$ and $A_3$, wherein $A_1$ may be expressed as $(a_1, b_1, c_1)$, $A_2$ may be expressed as $(a_2, b_2, c_2)$, and $A_3$ may be expressed as $(a_3, b_3, c_3)$, and clustering of the lines may be converted into clustering of the points.

$A_1$, $A_2$ and $A_3$ are taken as row vectors to form a matrix, which is denoted as matrix A.

A covariance matrix of $A_1$, $A_2$ and $A_3$ is calculated, which may be denoted as $\Sigma$.

The covariance matrix is subjected to a parameter normalization, and a result thereafter may be denoted as $A^*$.

$$A^* = A * \sum^{-\frac{1}{2}} = \begin{bmatrix} A_1 \\ A_2 \\ A_3 \end{bmatrix} * \sum^{-\frac{1}{2}} = \begin{bmatrix} a_1 & b_1 & c_1 \\ a_2 & b_2 & c_2 \\ a_3 & b_3 & c_2 \end{bmatrix} * \sum^{-\frac{1}{2}} = \begin{bmatrix} A_1^* \\ A_2^* \\ A_3^* \end{bmatrix} = \begin{bmatrix} a_1^* & b_1^* & c_1^* \\ a_2^* & b_2^* & c_2^* \\ a_3^* & b_3^* & c_3^* \end{bmatrix}$$

The points $A^*_1$, $A^*_2$ and $A^*_3$ and after the normalization may be clustered through hierarchical clustering, and lines corresponding to a same category of data may be merged into a same line cluster.

After the merging into the same line clusters, line clusters not meeting predetermined conditions are deleted. The predetermined conditions may be a line cluster with too many pixels, a line cluster with too few pixels, and/or a line cluster with a too small length.

The line cluster with too many pixels may refer to a line cluster with pixels unevenly distributed, e.g., the pixels are concentrated in a local area while the pixels in the remaining area are sparse. The too few pixels may mean that the number of pixels in the line cluster is lower than a preset number. The too small length may mean that the length of the line cluster is smaller than a preset length.

According to the above solution, the lines can be clustered by the normalization, thereby improving the accuracy of the determined lines.

Figure 5:
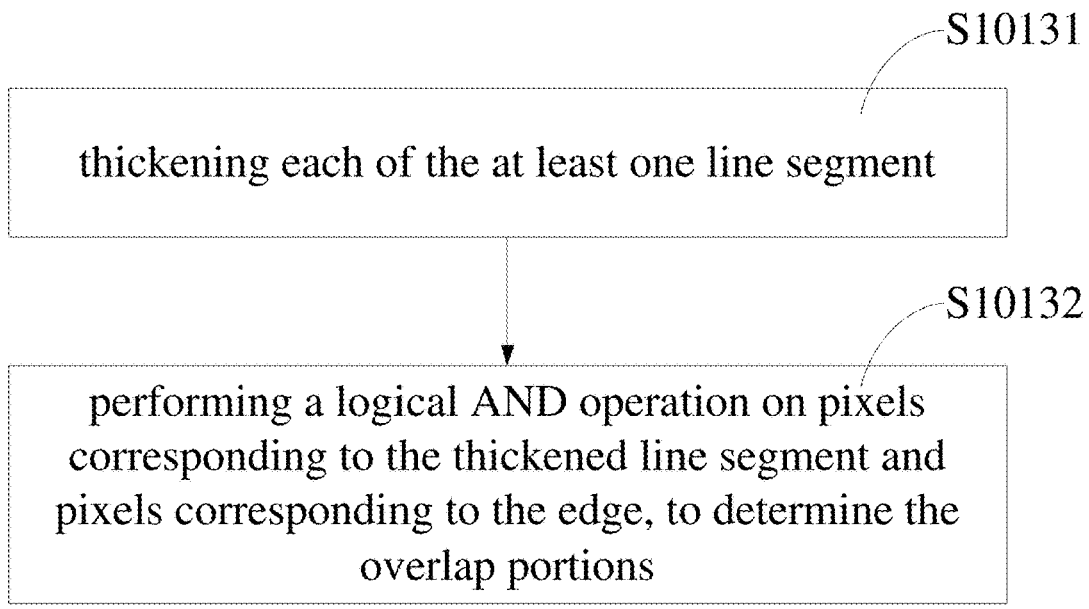
FIG. 5 is a flowchart of determination of an overlap portion of a line segment with an edge according to the present disclosure.

As shown in FIG. 5, in one embodiment, determining an overlap portion of each of the at least one line segment with the edge in S1013 includes the sub-steps of:

S10131: thickening each of the at least one line segment;
S10132: performing a logical AND operation on pixels corresponding to the thickened line segment and pixels corresponding to the edge, to determine the overlap portions.

Since what is determined by the Hough straight line detection is the line segment, there may be a situation that the line segment cannot completely coincide with the edge of the curve. On this basis, each of the at least one line segment obtained by the Hough straight line detection may be thickened to obtain a thickened line segment. For example, each of the line segments may be widened by 6 pixels.

A logical AND operation may be performed on the pixels corresponding to the thickened line segment and the pixels corresponding to the edge, so as to determine the overlap portions completely.

According to the above solution, the overlap portion of the straight line segment with the edge can be accurately obtained by thickening the straight line segment, that is, the line segment in the road image can be accurately obtained, which lays a foundation for the subsequent determination of the vehicle lane line.

Figure 6:
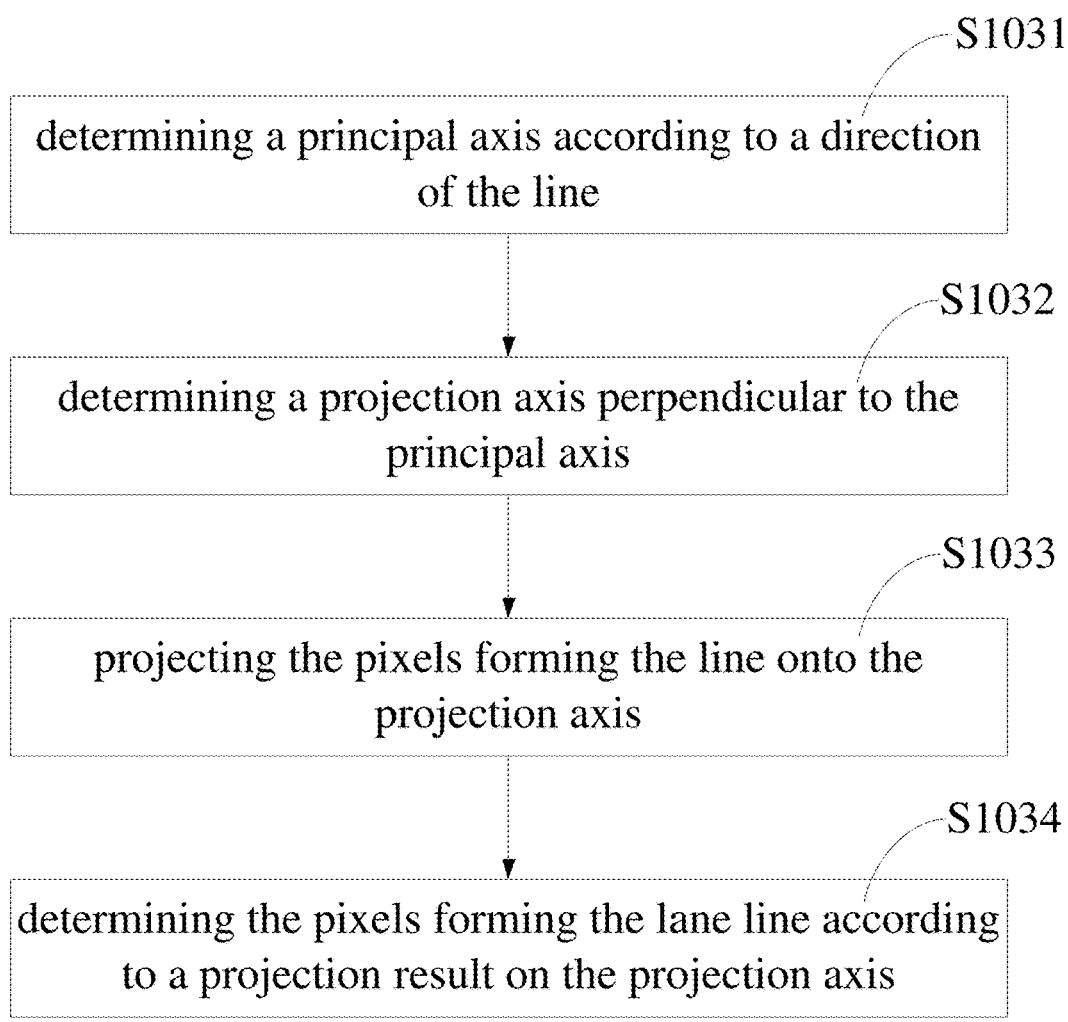
FIG. 6 is a flowchart of determination of pixels forming a lane line according to the present disclosure.

As shown in FIG. 6, in one embodiment, screening the pixels forming the line and determining the pixels forming the lane line in step S103 includes the steps of:

S1031: determining a principal axis according to a direction of the line;
S1032: determining a projection axis perpendicular to the principal axis;
S1033: projecting the pixels forming the line onto the projection axis;
S1034: determining the pixels forming the lane line according to a projection result on the projection axis.

In this step, based on calibration parameters of the image acquisition device, the pixels forming each line may be transformed into a vehicle coordinate system of the target vehicle through an inverse perspective transformation. The vehicle coordinate system of the target vehicle may be a three-dimensional coordinate system.

Figure 7:
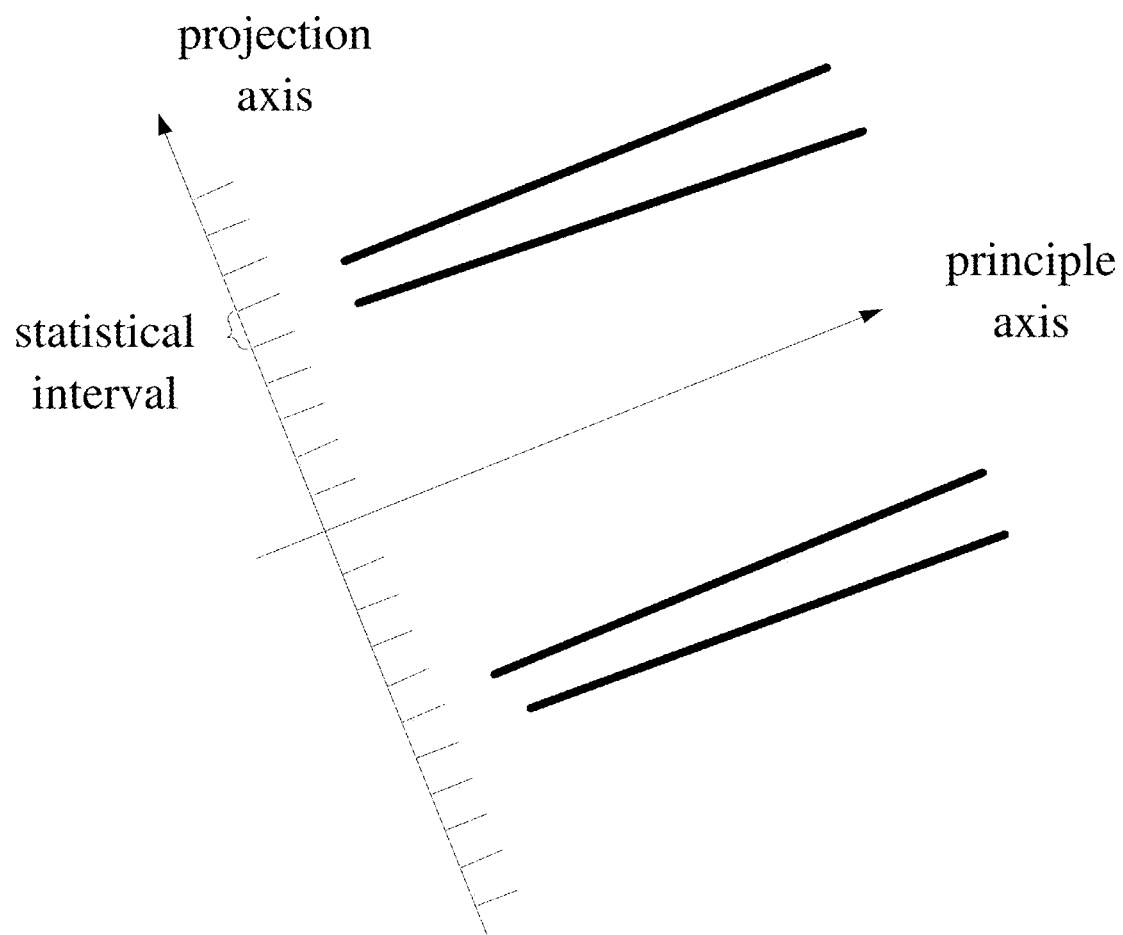
FIG. 7 is a schematic diagram of determination of a principal axis and a projection axis according to the present disclosure.

As shown in FIG. 7, in general, four lines on left and right sides of a body of a target vehicle can be obtained at a same moment, and the four lines are corresponding to an inner edge and an outer edge of a lane line respectively. In the actual scene, the essence of the four lines in FIG. 7 is a collection of pixels.

By taking the vehicle coordinate system as a reference, a principal component analysis of the pixels forming the line segment may be performed to determine the principal axis of the line formed by the pixels. With reference to the example in FIG. 7, the direction of the principal axis may be understood as an average direction determined from the directions of the four lines.

After the principal axis is determined, the projection axis perpendicular to the principal axis may be determined according to a perpendicular relationship.

A plurality of statistical intervals are determined on the projection axis. For example, the statistical intervals may be spaced apart at a distance of 10 cm.

Each of the pixels forming the line may be projected onto the projection axis, so as to determine the number of pixels projected into each of the statistical intervals. The statistical intervals are screened according to the number of the pixels, and finally the pixels projected into the remaining statistical intervals are determined as the pixels forming the lane line.

The way of screening may include: determining the number of pixels in any statistical interval, and deleting the pixels projected into the statistical interval when the number of pixels is less than a number threshold; and/or, determining a distribution length of the pixels projected into any statistical interval along the direction of the principal axis, and deleting the pixels projected into the statistical interval when the distribution length is lower than a length threshold.

The pixels remaining after the screening through the above step are taken as the pixels forming the lane line.

In addition, in order to improve the accuracy, the pixels may be filtered before projection. For example, a width between two adjacent lane lines is generally 3.75 meters. On this basis, pixels far away (e.g., more than 2 meters) from the target vehicle may be filtered out.

According to the above solution, after a plurality of lines are obtained, a principal axis can be determined according to the directions of the lines. The utilization of the direction of the principal axis can make the subsequent projection be relatively accurate to the greatest extent, and lay a foundation for subsequent determination of the pixels forming the lane line.

In one embodiment, the road image is an image labelled with a time stamp and acquired by an image acquisition device;

wherein four image acquisition devices are disposed on left and right sides of a target vehicle, respectively, and orientations of the image acquisition devices are perpendicular to a travelling direction of the target vehicle;

in S103, fitting the pixels forming the lane line to obtain the lane line includes:

respectively fitting pixels in the road images collected by the image acquisition devices disposed on the left and right sides of the target vehicle according to the time stamp to obtain the lane line.

Figure 8:
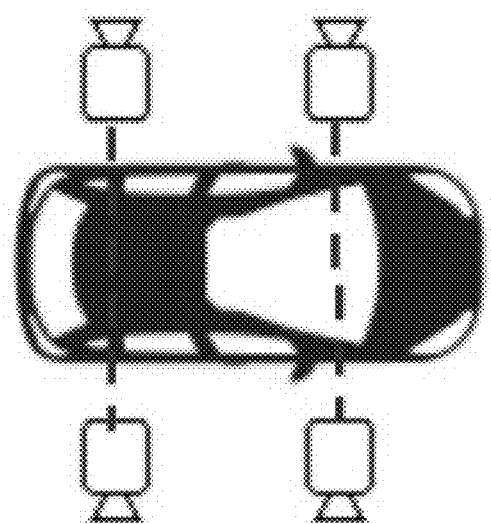
FIG. 8 is a schematic diagram of an image acquisition device and a target vehicle according to the present disclosure.

There may be a plurality of image acquisition devices. With reference to FIG. 8, in a preferred example, there are four of the image acquisition devices, which may be respectively disposed on both sides of each of four wheels of the target vehicle. The orientations of the image acquisition devices may be perpendicular to the travelling direction of the target vehicle.

In this embodiment, the time stamp may be utilized to load time tags on the images collected by the four image acquisition devices, respectively. The subsequent fitting for the lane line may be performed based on the road images corresponding to the same time stamp, so as to obtain the final lane line.

In the embodiment of the present disclosure, since the image acquisition devices are distributed on both sides of the vehicle, in order to acquire the adjacent lane line, it is necessary to load a time stamp on the road image acquired by each of the image acquisition devices. Therefore, the pixels in the road images collected by the image acquisition devices on the left and right sides of the target vehicle at the same moment may be fitted according to the time stamp to obtain the vehicle lane lines on the left and right sides of the target vehicle. In addition, compared with the front-view image acquisition device, the image acquisition device disposed on lateral sides of the target vehicle makes the collected image scenes be limited. Therefore, the elements in the road images are simpler and less susceptible to the environments on both sides of the road. Moreover, the vehicle lane line in the road image will not be obscured by other vehicles, so the accuracy is higher.

In one embodiment, fitting the pixels in the road images collected by the image acquisition devices disposed on left and right sides of the target vehicle respectively includes:

fitting the pixels in the road images collected by the image acquisition devices disposed on the left and right sides of the target vehicle according to a minimum slope error, so that slope errors of vehicle lane lines on the left and right sides of the target vehicle after the fitting are within an allowable range.

The pixels on the left and right sides of the target vehicle are fitted using the following formula, $$\min \sum_{i=1}^{n} \sum_{j=1}^{m} [(k_i * x_j + b_i) - y_j]^2 + \sum_{i=1}^{n-1} (k_i - k_{i+1})^2$$

wherein n may denote the number of statistical intervals, and i may denote an ordinal number of a statistical interval; m may denote the number of the pixels in the statistical interval, and j may denote an ordinal number of a pixel in the statistical interval. $k_i$ may denote a slope of the vehicle lane line on either the left side or the right side (e.g., the left side), and correspondingly, $k_{i+1}$ may denote a slope of a vehicle lane line on the other side (i.e., the right side) opposite to $k_i$, $x_j$ and $y_j$ may denote an x-axis coordinate and a y-axis coordinate of an j-th pixel in an i-th interval, and $b_i$ may denote a constant term (for example of the vehicle lane line on the left side).

That is, on the one hand, since a linear equation is y=kx+b, all pixels belonging to the straight line satisfy the linear equation, i.e., $(k_i * x_j + b_i) - y_j = 0$ in ideal situations. However, in actual situations, not all the pixels can satisfy the linear equation, so the adjacent pixels can be retained to the greatest extent by fitting the linear equation in the least square method.

On the other hand, a difference between $k_i$ and $k_{i+1}$ is utilized to constrain the fitting process of the vehicle lane lines on the left and right sides, so that the two fitted vehicle lane lines are parallel to each other.

In addition, in the embodiment of the present disclosure, the linear equation is adopted to fit the pixels on the left and right sides of the target vehicle, because the collection field of view of either of the image acquisition devices disposed on the same side of the target vehicle is generally about 4 meters. By expressing the vehicle lane line having a length of 4 meters with the linear equation, a good balance can be achieved between the expression accuracy and the calculation complexity. It is not difficult to understand that the vehicle lane line can also be fitted with a quadratic equation, a cubic equation, etc., which is not described here.

According to the above solution, by constraining the fitting of the pixels with a parallel relationship between two adjacent vehicle lane lines, the accuracy of the fitted vehicle lane lines can be increased.

Figure 9:
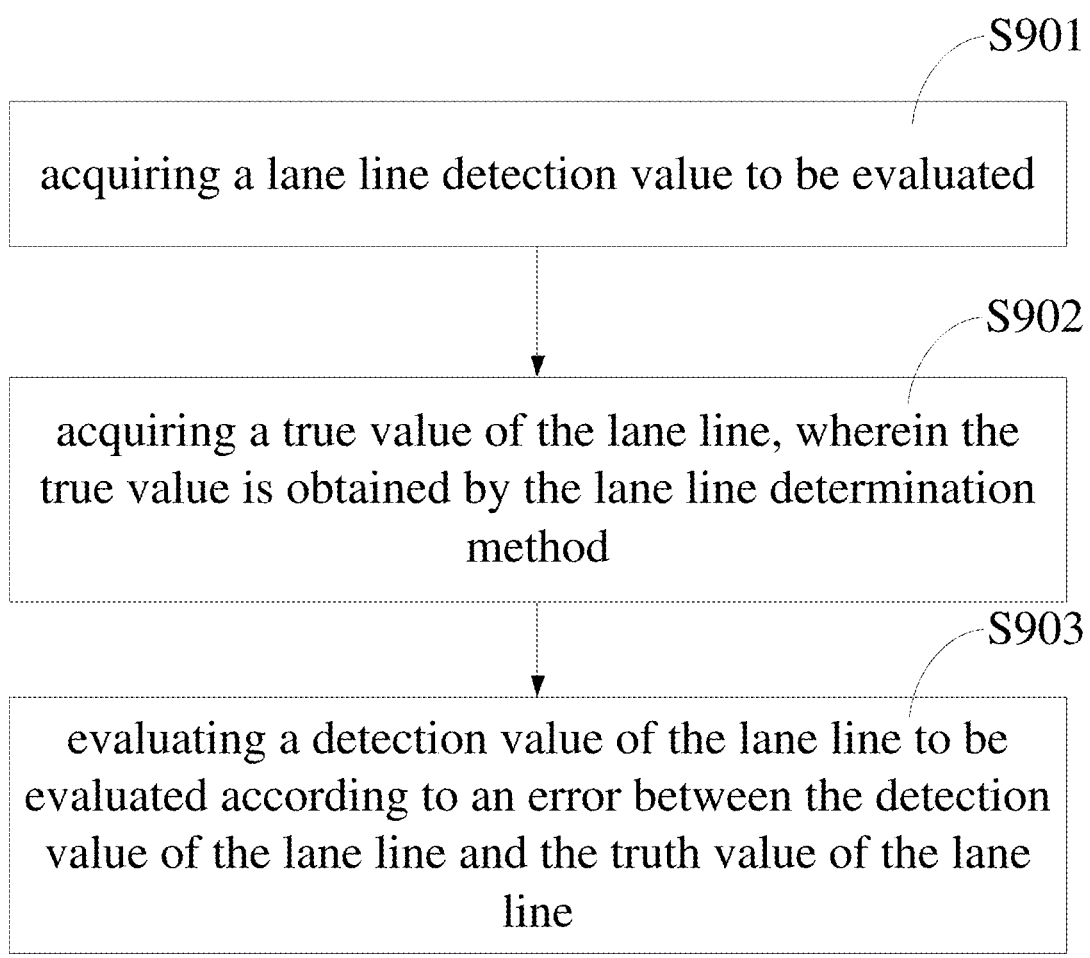
FIG. 9 is a flowchart of a lane line positioning accuracy evaluation method according to the present disclosure.

As shown in FIG. 9, an embodiment of the present disclosure provides a lane line positioning accuracy evaluation method, including the steps of:

S901: acquiring a detection value of the lane line to be evaluated;

S902: acquiring a true value of the lane line, wherein the true value is obtained by the lane line determination method;

S903: evaluating a detection value of the lane line to be evaluated according to an error between the detection value of the lane line and the true value of the lane line.

In the present embodiment, the lane line acquired in the lane line determination method may be taken as the true value of the lane line. The detection value of the lane line to be evaluated may be a lane line determined by a navigation device, a positioning device, etc.

The error may include a lateral difference, a heading angle difference, etc.

In related evaluation solutions, the true value of the vehicle lane line is usually acquired by manually labelling the vehicle lane line, that is, in the image taken by the front-view image acquisition device of the vehicle, the position of the vehicle lane line is manually labelled, and then processed to obtain a true value of self-positioning algorithm evaluation. In this method, a manual intervention is required, a large number of pictures need to be labelled and the cost is high. In addition, it is difficult to perceive the error of the manual labelling, and the labelling cycle is long.

This solution in the embodiment of the present disclosure can reduce the evaluation cost, ensure the consistency between the labeling rules, and quickly generate the true value of the vehicle lane line.

In one embodiment, a way of determining the error between the detection value of the lane line and the true value of the lane line in step S903 includes:

calculating a lateral difference between the detection value of the lane line and the true value of the lane line, and/or calculating a heading angle difference between the detection value of the lane line and the true value of the lane line;

taking the lateral difference and/or the heading angle difference as the error.

Figure 10:
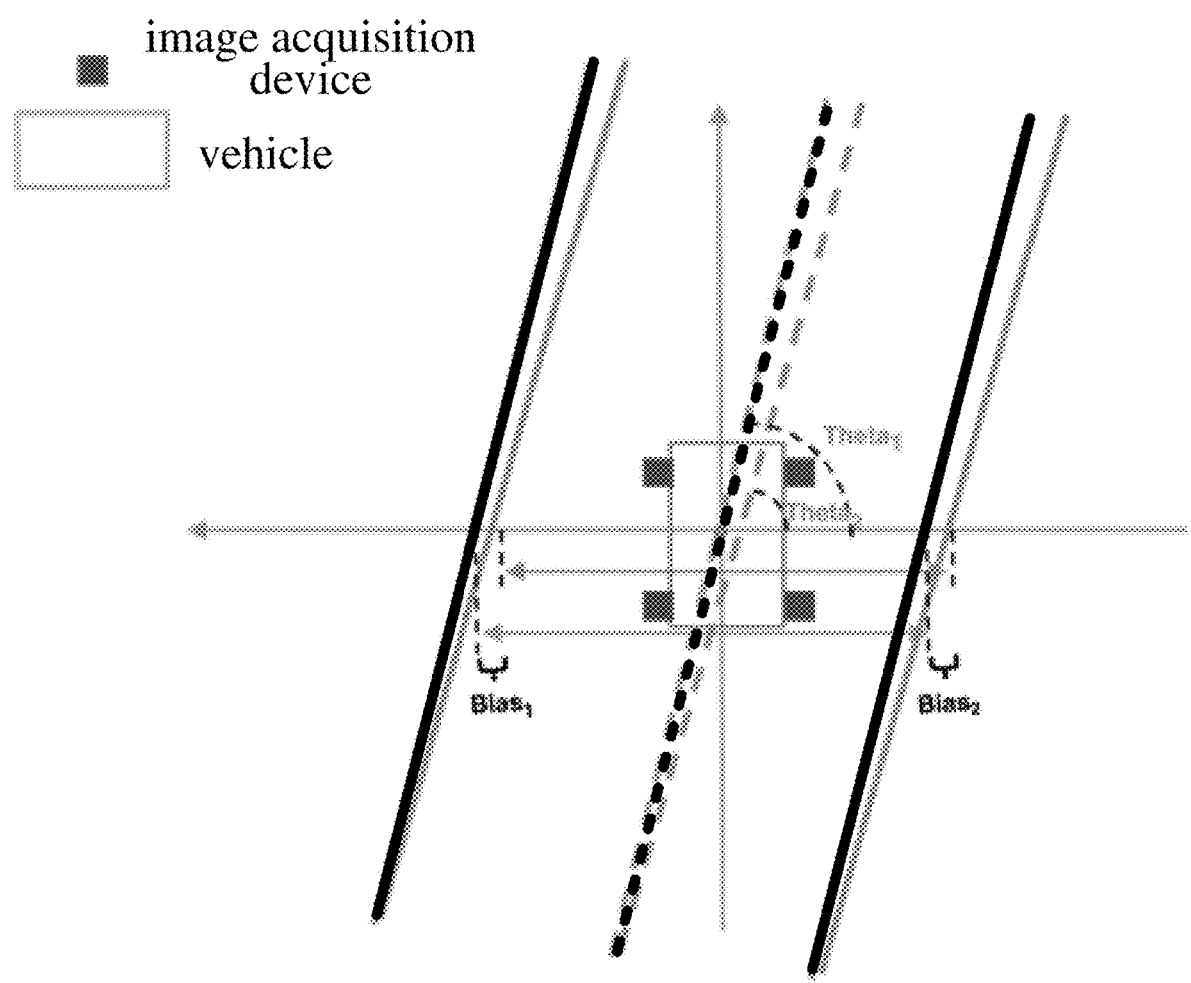
FIG. 10 is a schematic diagram of an error between a detection value of the lane line and a true value of the lane line according to the present disclosure.

As shown in FIG. 10, two thicker solid lines represent true values of the lane line, and two thinner solid lines represent detection value of the lane lines. A thicker dashed line represents a center line true value of a lane line determined from the true value of the lane line, and a thinner dashed line represents a center line detection value of the lane line determined from the detection value of the lane line.

$Bias_1$ and $Bias_2$ in the figure represent first and second lateral differences between the detection value of the lane line and the true value of the lane line, respectively. As shown in the following calculation formula, absolute values of the first and second lateral differences are averaged, and an obtained result $\Delta Bias$ is taken as the lateral difference between the detection value of the lane line and the true value of the lane line.

$$\Delta Bias=(|Bias_1|+|Bias_2|)/2$$

In addition, $Theta_1$ and $Theta_2$ in the figure represent first and second heading angle differences between the detection value of the vehicle lane line and the true value of the vehicle lane line, respectively. As shown in the following calculation formula, an absolute difference $\Delta Theta$ between the first and second heading angle differences is taken as the heading angle difference between the detection value of the vehicle lane line and the true value of the vehicle lane line.

$$\Delta Theta=(|Theta_1|-|Theta_2|)$$

According to the above solution, the lateral difference and/or the heading angle difference is taken as the error between the detection value of the vehicle lane line and the true value of the vehicle lane line, so as to realize an accurate evaluation.

In one embodiment, the detection value of the vehicle lane line to be evaluated is obtained according to a high-precision map positioning algorithm.

Figure 11:
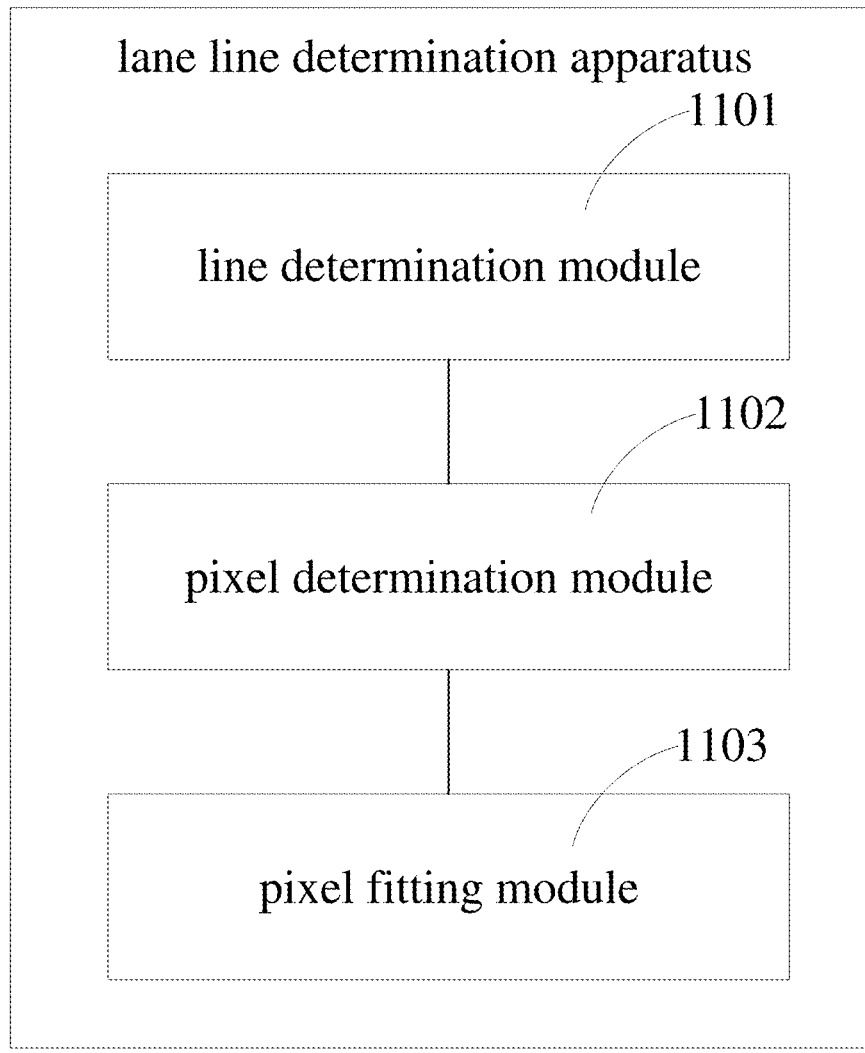
FIG. 11 is a schematic diagram of a lane line determination apparatus according to the present disclosure.

As shown in FIG. 11, an embodiment of the present disclosure provides a lane line determination apparatus, including:

a line determination module 1101 configured to determine a line in a received road image;

a pixel determination module 1102 configured to screen pixels forming the line and determine pixels forming a lane line; and a pixel fitting module 1103 configured to fit the pixels forming the lane line to obtain the lane line.

In one embodiment, the line determination module 1101 includes:

an edge determination submodule configured to determine an edge in the road image;

a line segment determination submodule configured to determine at least one line segment according to the edge;

a line determination execution submodule configured to determine an overlap portion of each of the at least one line segment with the edge, and determine the line according to the overlap portion.

In one embodiment, the line determination module 1101 further includes:

a curvilinear equation determination submodule configured to determine a curvilinear equation of each of the overlap portions;

a normalization submodule configured to normalize parameters in the curvilinear equation of each of the overlap portions;

the line determination execution submodule is further configured to cluster lines corresponding to the normalized curvilinear equation to obtain a clustering result, and determine the line in the road image according to the clustering result.

In one embodiment, the line determination execution submodule includes:

a line segment processing submodule configured to thicken each of the at least one line segment;

the line determination execution submodule is specifically configured to perform a logical AND operation on pixels corresponding to the thickened line segment and pixels corresponding to the edge, to determine the overlap portions.

In one embodiment, the pixel determination module 1102 includes:

a principal axis determination submodule configured to determine a principal axis according to a direction of the line;

a projection axis determination submodule configured to determine a projection axis perpendicular to the principal axis;

a pixel projection submodule configured to project the pixels forming the line onto the projection axis; and a pixel determination execution submodule configured to determine the pixels forming the lane line according to a projection result on the projection axis.

In one embodiment, the road image is an image labelled with a time stamp and acquired by an image acquisition device;

wherein four image acquisition devices are disposed on left and right sides of a target vehicle, respectively, and orientations of the image acquisition devices are perpendicular to a travelling direction of the target vehicle;

the pixel fitting module 1103 is specifically configured to respectively fit the pixels in the road images collected by the image acquisition devices disposed on the left and right sides of the target vehicle according to the time stamp to obtain the lane line.

In one embodiment, the pixel fitting module 1103 is specifically configured to:

fit the pixels in the road images collected by the image acquisition devices disposed on the left and right sides of the target vehicle according to a minimum slope error, so that slope errors of vehicle lane lines on the left and right sides of the target vehicle after fitting are within an allowable range.

Figure 12:
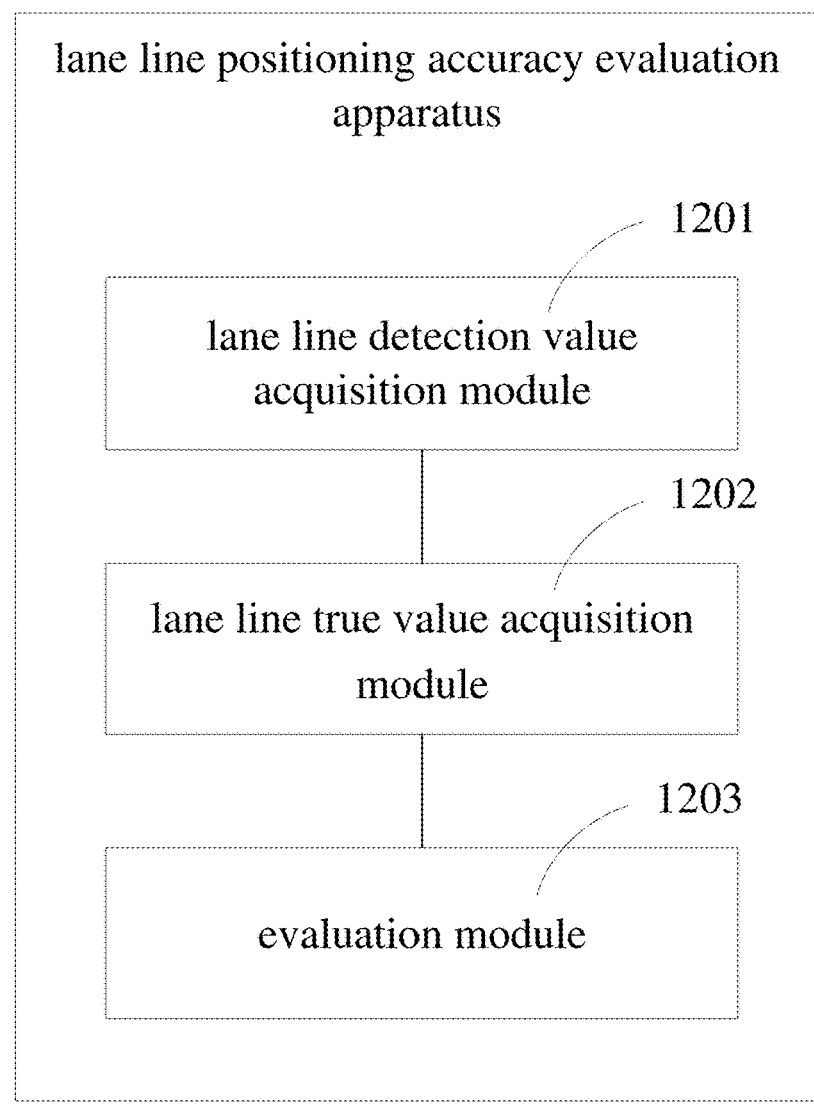
FIG. 12 is a schematic diagram of a lane line positioning accuracy evaluation apparatus according to the present disclosure.

As shown in FIG. 12, an embodiment of the present disclosure provides a lane line positioning accuracy determination apparatus, including:

a lane line detection value acquisition module 1201 configured to acquire a detection value of the lane line to be evaluated;

a lane line true value acquisition module 1202 configured to acquire a true value of the lane line obtained by the lane line determination apparatus;

an evaluation module 1203 configured to evaluate the detection value of the lane line to be evaluated according to an error between the detection value of the lane line and the true value of the lane line.

In one embodiment, the evaluation module 1203 includes:

a lateral difference calculation submodule configured to calculate a lateral difference between the detection value of the vehicle lane line and the true value of the vehicle lane line, and/or a heading angle difference calculation submodule configured to calculate a heading angle difference between the detection value of the vehicle lane line and the true value of the vehicle lane line;

the lateral difference and/or the heading angle difference is taken as the error between the detection value of the vehicle lane line and the true value of the vehicle lane line.

In one embodiment, the detection value of the vehicle lane line to be evaluated is obtained according to a high-precision map positioning algorithm.

According to the embodiments of the present disclosure, the present disclosure further provides an electronic device and a readable storage medium.

Figure 13:
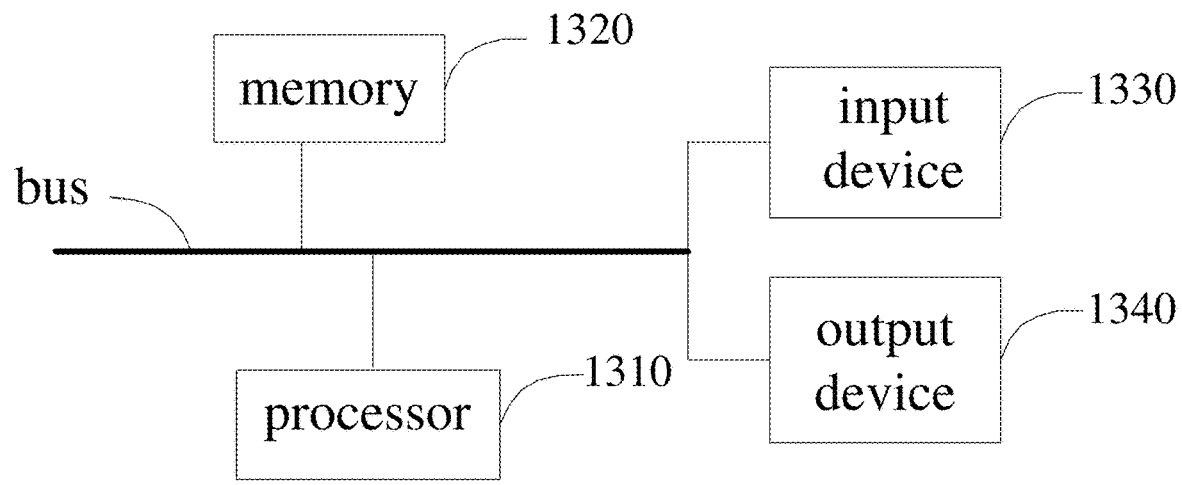
FIG. 13 is a block diagram of an electronic device for implementing a lane line determination method according to an embodiment of the present disclosure.

FIG. 13 is a block diagram of an electronic device for implementing a lane line determination method according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital processor, a cellular phone, a smart phone, a wearable device and other similar computing devices. The components illustrated herein, connections and relationships therebetween, and functions thereof are merely examples, and are not intended to limit the implementation of the present disclosure described and/or claimed herein.

As shown in FIG. 13, the electronic device includes: one or more processors 1310, a memory 1320, and interfaces for connecting various components, including a high-speed interface and a low-speed interface. The various components are connected to each other by different buses, and may be mounted on a common mainboard or mounted in other ways as required. The processor may process instructions executed in the electronic device, including instructions stored in or on the memory to display Graphical User Interface (GUI) graphical information on an external input/output device (e.g., a display device coupled to an interface). In other embodiments, if necessary, a plurality of processors and/or a plurality of buses may be used together with a plurality of memories. Similarly, a plurality of electronic devices may be connected, each providing some necessary operations (e.g., acting as a server array, a group of blade servers, or a multi-processor system). In FIG. 13, one processor 1310 is taken as an example.

The memory 1320 is a non-transitory computer-readable storage medium provided by the present disclosure. The memory stores instructions executable by at least one processor, so that the at least one processor can perform the vehicle lane line determination method provided by the present disclosure. The non-transitory computer-readable storage medium of the present disclosure stores a computer instruction for enabling a computer to perform the vehicle lane line determination method provided by the present disclosure.

As a non-transitory computer readable storage medium, the memory 1320 may be configured to store a non-transitory software program, a non-transitory computer executable program and modules, such as program instructions/modules corresponding to the lane line determination method in the embodiments of the present disclosure (e.g., the line determination module 1001, the pixel determination module 1002, and the pixel fitting module 1003 as shown in FIG. 10, or the detection value of the lane line acquisition module 1101, the lane line true value acquisition module 1102 and the evaluation module 1103 as shown in FIG. 11). The processor 1310 executes various functional applications and data processing of the electronic device by running the non-transitory software programs, instructions and modules stored in the memory 1320, thereby realizing the lane line determination method in the above method embodiments.

The memory 1320 may include a program storage area and a data storage area, wherein the program storage area may store an operating system, and an application program required by at least one function; and the data storage area may store data created according to the use of the electronic device for implementing the lane line determination method. In addition, the memory 1320 may include a high-speed random-access memory, and may also include a non-transitory memory, such as at least one magnetic disk memory device, a flash memory device, or any other non-transitory solid memory device. In some embodiments, the memory 1320 optionally includes memories remotely located relative to the processor 1310, and these remote memories may be connected to the electronic device for implementing the lane line determination method through a network. Examples of the network include, but are not limited to, the Internet, an intranet, a local area network, a mobile communication network and combinations thereof.

The electronic device for implementing the lane line determination method may further include: input means 1330 and output means 1340. The processor 1310, the memory 1320, the input means 1330, and the output means 1340 may be connected by buses or in other ways, and the bus connection is taken as an example in FIG. 13.

The input means 1330 may receive input digitals or character information, and generate a key signal input related to a user setting and a function control of the electronic device for implementing the lane line determination method. The input means 1330 for example may be a touch screen, a keypad, a mouse, a track pad, a touch pad, an indicator stick, one or more mouse buttons, a trackball, a joystick, etc. The output means 1340 may include a display device, an auxiliary lighting apparatus (e.g., a light-emitting diode (LED)), a haptic feedback apparatus (e.g., a vibration motor), etc. The display device may include, but is not limited to, a liquid crystal display (LCD), an LED display, and a plasma display. In some embodiments, the display device may be a touch screen.

Various embodiments of the system and technology described here may be implemented in a digital electronic circuit system, an integrated circuit system, an Application Specific Integrated Circuit (ASIC), computer hardware, firmware, software, and/or combinations thereof. These various embodiments may be implemented in one or more computer programs executable and/or interpretable on a programmable system including at least one programmable processor, and the programmable processor may be a dedicated or general programmable processor and capable of receiving and transmitting data and instructions from and to a storage system, at least one input means, and at least one output means.

These computing programs (also called as programs, software, software applications, or codes) include machine instructions of the programmable processor, and may be implemented with advanced processes and/or object-oriented programming languages, and/or assembly/machine languages. As used herein, the terms 'machine-readable medium' and 'computer-readable medium' refer to any computer program product, device, and/or apparatus (e.g., a magnetic disk, an optical disk, a memory and a programmable logic device (PLD)) for providing the machine instructions and/or the data to the programmable processor, including a machine-readable medium that receives machine instructions as machine-readable signals. The term 'machine readable signal' refers to any signal for providing the machine instructions and/or the data to the programmable processor.

In order to provide an interaction with a user, the system and the technology described here may be implemented on a computer having a display apparatus (e.g., a cathode ray tube (CRT) or an LCD monitor) for displaying information to the user; and a keyboard and a pointing apparatus (e.g., a mouse or a trackball), through which the user can provide an input to the computer. Other kinds of apparatuses can also provide an interaction with the user. For example, a feedback provided to the user may be any form of sensory feedback (e.g., a visual feedback, an auditory feedback, or a tactile feedback); and an input from the user may be received in any form (including an acoustic input, a voice input or a tactile input).

The system and the technology described here may be embodied in a computing system including background components (e.g., acting as a data server), or a computing system including middleware components (e.g., an application server), or a computing system including front-end components (e.g., a user computer with a graphical user interface or a web browser, through which the user can interact with the embodiments of the system and technology described here), or a computing system including any combination of such background components, middleware components and front-end components. The components of the system may be connected to each other through a digital data communication in any form or medium (e.g., a communication network). Examples of the communication network include a local area network (LAN), a wide area network (WAN), and the Internet.

A computer system may include a client and a server. The client and the server are generally remote from each other and usually interact through a communication network. The relationship between the client and the server is generated by computer programs running on corresponding computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS).

It should be understood that the steps may be reordered, added or deleted using the various forms of flows as illustrated above. For example, the steps described in the present disclosure may be performed concurrently, sequentially or in a different order, so long as the desired result of the technical solution disclosed in the present disclosure can be achieved, which is not limited herein.

The specific embodiments do not limit the protection scope of the present disclosure. It should be understood by those skilled in the art that various modifications, combinations, sub-combinations and replacements can be made according to the design requirements and other factors. Any modification, equivalent replacement and improvement made under the spirit and principle of the present disclosure should fall within the protection scope of the present disclosure.

What is claimed is:

1. A lane line determination method, comprising:
   determining a line in a received road image, comprising:
   determining an edge in the road image;
   determining at least one line segment according to the edge; and
   determining overlap portions between each of the at least one line segment with the edge, and determining the line according to the overlap portions;
   screening pixels forming the line, and determining pixels forming a lane line; and
   fitting the pixels forming the lane line to obtain the lane line.

2. The method according to claim 1, wherein determining the line in the received road image further comprises:
   determining a curvilinear equation of each of the overlap portions;
   normalizing parameters in the curvilinear equation of each of the overlap portions; and
   clustering lines corresponding to the normalized curvilinear equation to obtain a clustering result, and determining the line in the road image according to the clustering result.

3. The method according to claim 1, wherein determining the overlap portions of each of the at least one line segment with the edge comprises:
   thickening each of the at least one line segment; and
   performing a logical AND operation on pixels corresponding to the thickened line segment and pixels corresponding to the edge, to determine the overlap portions.

4. The method according to claim 1, wherein screening the pixels forming the line and determining the pixels forming the lane line comprises:
   determining a principal axis according to a direction of the line;
   determining a projection axis perpendicular to the principal axis;
   projecting the pixels forming the line onto the projection axis; and
   determining the pixels forming the lane line according to a projection result on the projection axis.

5. The method according to claim 1, wherein the road image is an image labeled with a time stamp and acquired by image acquisition devices;
   wherein four image acquisition devices are disposed on left and right sides of a target vehicle, respectively, and orientations of the image acquisition devices are perpendicular to a travelling direction of the target vehicle;
   wherein fitting the pixels forming the lane line to obtain the lane line comprises:
   receptively fitting pixels in the road images collected by the image acquisition devices disposed on the left and right sides of the target vehicle according to the time stamp to obtain the lane line.

6. The method according to claim 5, wherein receptively fitting the pixels in the road images collected by the image collection devices disposed on the left and right sides of the target vehicle respectively comprises:
fitting the pixels in the road images collected by the image collection devices disposed on the left and right sides of the target vehicle according to a minimum slope error, so that slope errors of lane lines on the left and right sides of the target vehicle after the fitting are within an allowable range.

7. A lane line positioning accuracy evaluation method, comprising:
acquiring a detection value of the lane line to be evaluated;
acquiring a true value of the lane line, wherein the true value is obtained by the method according to claim 1; and
evaluating a detection value of the lane line to be evaluated according to an error between the detection value of the lane line and the true value of the lane line.

8. The method according to claim 7, wherein determining the error between the detection value of the lane line and the true value of the lane line comprises:
calculating a lateral difference between the detection value of the lane line and true value of the lane line, and/or
calculating a heading angle difference between the detection value of the lane line and the true value of the lane line; and
taking the lateral difference and/or the heading angle difference as the error between the detection value of the lane line and the true value of the lane line.

9. The method according to claim 7, wherein the detection value of the lane line to be evaluated is obtained according to a high-precision map positioning algorithm.

10. A non-transitory computer readable storage medium for storing computer instructions, wherein the computer instructions, when executed by a computer, cause the computer to perform the method according to claim 7.

11. A non-transitory computer readable storage medium for storing computer instructions, wherein the computer instructions, when executed by a computer, cause the computer to perform the method according to claim 1.

12. A lane line determination apparatus, comprising:
at least one processor; and
a memory communicatively connected to the at least one processor, wherein
the memory stores instructions executable by the at least one processor, the instructions are executed by the at least one processor to enable the at least one processor to:
determine a line in a received road image, where the instructions are executed by the at least one processor to enable the at least one processor to:
determine an edge in the road image;
determine at least one line segment according to the edge; and
determine overlap portions of each of the at least one line segment with the edge, and determine the line according to the overlap portions;
screen pixels forming the line and determine pixels forming a lane line; and
fit the pixels forming the lane line to obtain the lane line.

13. The apparatus according to claim 12, wherein the instructions are executed by the at least one processor to enable the at least one processor further to:
determine a curvilinear equation of each of the overlap portions;
normalize parameters in the curvilinear equation of each of the overlap portions; and
cluster lines corresponding to the normalized curvilinear equation to obtain a clustering result, and determine the line in the road image according to the clustering result.

14. The apparatus according to claim 12, wherein the instructions are executed by the at least one processor to enable the at least one processor further to:
thicken each of the at least one line segment; and
perform a logical AND operation on pixels corresponding to the thickened line segment and pixels corresponding to the edge, to determine the overlap portions.

15. The apparatus according to claim 12, wherein the instructions are executed by the at least one processor to enable the at least one processor further to:
determine a principal axis according to a direction of the line;
determine a projection axis perpendicular to the principal axis;
project the pixels forming the line onto the projection axis; and
determine the pixels forming the lane line according to a projection result on the projection axis.

16. The apparatus according to claim 12, wherein the road image is an image labeled with a time stamp and acquired by image acquisition devices;
wherein four image acquisition devices are disposed on left and right sides of a target vehicle, respectively, and orientations of the image acquisition devices are perpendicular to a travelling direction of the target vehicle;
wherein the instructions are executed by the at least one processor to enable the at least one processor further to respectively fit the pixels in the road images collected by the image acquisition devices disposed on the left and right sides of the target vehicle according to the time stamp to obtain the lane line.

17. A lane line positioning accuracy evaluation apparatus, comprising:
at least one processor; and
a memory communicatively connected to the at least one processor, wherein
the memory stores instructions executable by the at least one processor, the instructions are executed by the at least one processor to enable the at least one processor to:
acquire a detection value of a lane line to be evaluated;
acquire a true value of the lane line obtained by the apparatus according to claim 12; and
evaluate the detection value of the lane line to be evaluated according to an error between the detection value of the lane line and the true value of the lane line.

18. The apparatus according to claim 17, wherein the instructions are executed by the at least one processor to enable the at least one processor further to:
calculate a lateral difference between the detection value of the lane line and the true value of the lane line, and/or
calculate a heading angle difference between the detection value of the lane line and the true value of the lane line; and
the lateral difference and/or the heading angle difference is taken as the error between the detection value of the lane line and the true value of the lane line.

* * * * *